United States Patent [19]

Zelenz

[11] 4,222,066

[45] Sep. 9, 1980

[54] CATV SUBSCRIPTION SERVICE CONTROL DEVICE AND ATTENUATOR THEREFOR

[75] Inventor: Martin L. Zelenz, Manlius, N.Y.

[73] Assignee: North American Philips Corporation, New York, N.Y.

[21] Appl. No.: 863,455

[22] Filed: Dec. 22, 1977

[51] Int. Cl.² .......................... H04N 7/16; H01P 1/22
[52] U.S. Cl. .................. 358/114; 333/81 R; 333/109; 333/262; 358/86
[58] Field of Search ................ 325/308, 483; 358/114, 358/115, 118, 120, 122, 86, 84; 333/10, 81 R, 97 S, 7 R, 7 D, 109, 262

[56] References Cited

U.S. PATENT DOCUMENTS

| | | | |
|---|---|---|---|
| 3,188,384 | 6/1965 | Townsend | 358/84 |
| 3,452,299 | 6/1969 | Angel | 333/7 D |
| 3,859,457 | 1/1975 | Kirk, Jr. | 358/114 |
| 3,898,375 | 8/1975 | Hannan et al. | 358/115 |
| 3,921,106 | 11/1975 | Williams | 333/81 R |
| 3,989,887 | 11/1976 | Murphy | 358/114 |
| 4,039,954 | 8/1977 | Toonder | 358/122 |

OTHER PUBLICATIONS

CL & B Release for Magnavox MX4000 RSC, Apr. 13, 1976, Conklin, Labs & Bebee Inc., Syracuse, NY 13201.

*Primary Examiner*—S. C. Buczinski
*Attorney, Agent, or Firm*—Thomas A. Briody; William J. Streeter; Edward W. Goodman

[57] ABSTRACT

A CATV subscription service control device has a switched buffer to prevent jamming signals from a switched attenuator from propagating throughout the system. The attenuator uses mutual inductance to achieve a high degree of attenuation.

7 Claims, 3 Drawing Figures

CATV SUBSCRIPTION SERVICE CONTROL DEVICE AND ATTENUATOR THEREFOR

BACKGROUND OF THE INVENTION

The present invention relates to a community antenna television (CATV) tap, and more particularly to one having remote subscriber service control In CATV, a common antenna is used to pick up broadcast signals. These signals are amplified and feed into a transmission line. At intervals along the line are "taps" that pick off some of the transmission line signal and distribute it to, typically four, subscribers. If a subscriber should not pay his bill for the CATV service, it is desired by the CATV system operator to disconnect him. Because of the cost of sending a person to the tap, this should be done remotely from the signal source. This is accomplished by sending address digits on the line, which uniquely identify a tap and a subscriber coupled to that tap, and then sending control digits to turn off the service. A tap capable of so responding is called "addressable".

To actually cut off service, a variety of techniques have been used. One uses an electro-mechanical or electrical switch to attenuate the subscriber signal. A problem with such an approach is that a very high degree of attenuation, typically about 50 to 60 dB, is required to ensure that no detectable signal leaks through to the subscriber. This is expensive to achieve. Another technique is to jam the subscriber's signal. This requires an oscillator for every channel to be jammed, which is expensive, and the jamming signals can likewise be propogated into other subscriber's lines.

It is therefore an object of the present invention to provide an inexpensive subscriber service control function for an addressable tap.

It is a further object to provide one that causes a minimum of interference with other subscribers.

It is yet another object to provide an attenuator for such a tap that has a high degree of attenuation.

SUMMARY OF THE INVENTION

In brief, these and other objects are achieved by having a switched attenuator switched in accordance with a control signal. A buffering circuit before the attenuator prevents the jamming signal from interfereing with other subscriber's reception. The attenuator uses mutual inductance to achieve a high degree of attenuation with a minimum number of parts, thus reducing costs.

These and other objects, features, and advantages, will become apparent from the following description when taken in conjunction with the drawings in which:

DETAILED DESCRIPTION

Figure 1:
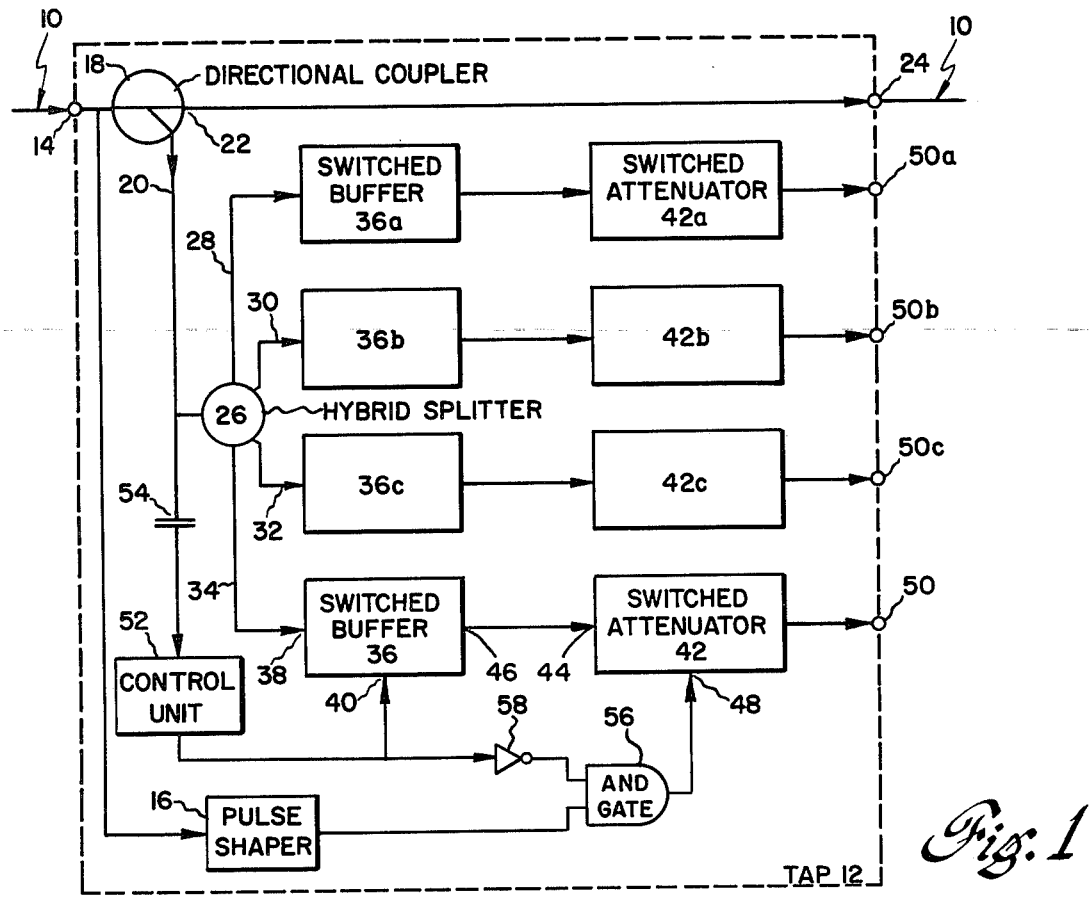
FIG. 1 is a block diagram of the invention.

In FIG. 1, the incoming portion of a coaxial cable 10 is coupled to the tap 12 at an input connector 14. In general, the incoming portion of cable 10 comes from an identical previous tap (not shown) and carries radio frequency television signals, 60 Hz power, and digital addressing and command signals that FSK modulate a carrier. A pulse shaper 16 is coupled to connector 14 to receive the 60 Hz power and provides at its output a jamming signal comprising a 60 Hz pulse signal having a fifteen percent duty factor. A directional coupler 18 is also coupled to connector 14. It has an output 20, which provides a sample of the television and control signals present on cable 10, and an output 22 coupled to output connector 24. Connector 24 is coupled to the outgoing portion of coaxial cable 10, which in turn goes to the next succeeding tap (not shown).

A hybrid splitter 26 is of a conventional ferrite loaded design. It has an input coupled to output 20, and a plurality of output ports 28, 30, 32, and 34, that each provide the television signals with about 30 dB of port-to-port isolation. The subscriber channels that follow the output ports 28, 30, 32, and 34 are all identical so only one will be described. A switched buffer 36 has a signal input 38 coupled to port 34 and a control input 40. A switched attenuator 42 has a signal input 44 coupled to buffer output 46, a control input 48, and an output 50 that is coupled to a subscriber's set. Similarly, the other subscriber channels have switched buffers 36a, 36b, 36c; switched attenuators 42a, 42b, and 42c, and subscriber outputs 50a, 50b and 50c. The other subscriber channel buffers and attneuators also have control signal inputs which are not shown for the sake of clarity.

A control unit 52 is coupled through a capacitor 54 to coupler output 20 and provides a control signal to control input 40 as well as to one input of AND gate 56 through inverter 58.

The jamming signal from shaper 16 is applied to the outer input of AND gate 56. It will be appreciated that control unit 52 has three other outputs for controlling the other subscriber channels, and that the jamming signal is also applied to corresponding AND gates in said channels. The output of gate 56 is coupled to control input 48.

Briefly, the conventional control unit 52 comprises a discriminator for detecting the FSK digital signals, a digital comparator for comparing the transmitted address bits with the address of the tap "hardwired" into it, and if there is an address match, then an instruction register stores the following instruction bits and applies them to the proper buffer.

In operation, when power and television signals are first applied to cable 10, a logic zero is at the output of control unit 52 and the jamming signal is at the output of pulse shaper 16. The logic zero causes buffer 36 to have about 10 dB of attenuation and gate 56 to have a logic one at its upper input due to inverter 58. This allows the jamming signal to pass through the gate 56 to attenuator 42 to switch in and out about 30 dB of attenuation at the 60 Hz rate. The automatic gain control circuit of the subscriber's TV set coupled to output 50 has a time constant longer than this rate, so it cannot compensate. The result is a "snowy" picture and/or loss of horizontal synchronization, the overall effect looking like severe induced aircraft flutter. A minimum of about 20 dB loss in attenuator 42 is needed to achieve this effect. The buffer 36 loss of 10 dB, together with the port-to-port isolation of 30 dB in splitter 26, results in a port-to-port rejection of 40 dB for the jamming signal. This is sufficient to prevent the jamming signal from interfering noticeably with other subscribers.

If it is desired to provide service to a particular subscriber, the digital information will contain address digits for the tap the subscriber is coupled to as well as which of the four subscriber outputs 50, 50a, 50b, and 50c is his. These will be detected and compared in control unit 52. Instruction bits will carry the turn on command and cause a logic one to appear at the output of control unit 52. This results in buffer 36 being in a low loss condition. Since inverter 58 applies a logic zero to gate 56, no jamming signal reaches attenuator 42, which likewise is then in a low loss state. The overall loss for both buffer 36 and attenuator 42 is about one dB. Clearly, television signals can now reach the subscriber.

Figure 2:
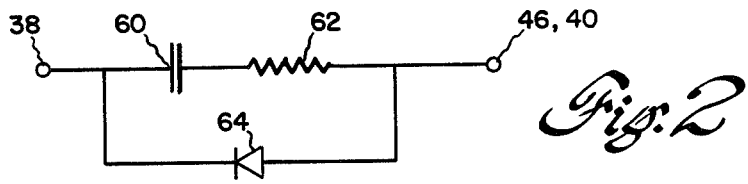
FIG. 2 is a schematic diagram of a switched buffer used in FIG. 1.

FIG. 2 shows a circuit that can be used as the switched buffer 36 of FIG. 1. It comprises a series circuit of a capacitor 60 and a resistor 62 coupled between signal input terminal 38 and output 46. A PIN diode 64 is coupled across the series circuit, and output 46 also serves as the control input 40. When a logic zero is applied to output 46, the diode 64 is non-conducting and the series circuit causes 10 dB of attenuation. When a logic one is applied to output 46, a positive voltage appears on the anode of diode 64 causing it to conduct and thus shunt the series circuit, resulting in a low attenuation.

Figure 3:
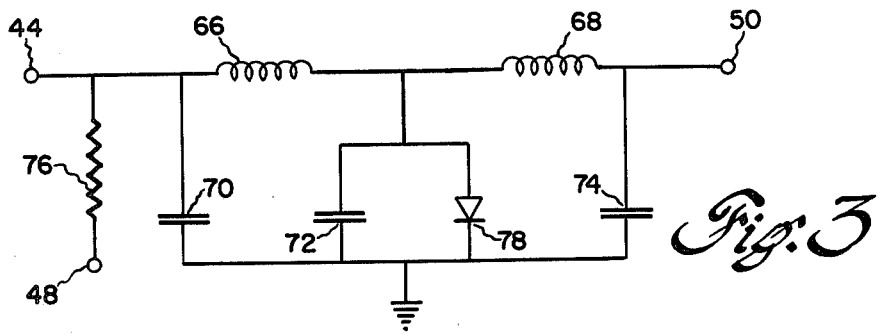
FIG. 3 is a schematic diagram of a switched attenuator used in FIG. 1.

FIG. 3, shows a circuit for the switched attenuator 42 in FIG. 1. A pair of coils 66 and 68 are coupled between input 44 and output 50. They are shunted to ground by capacitors 70, 72, and 74. The capacitor 72 is selected to provide a 75 ohm characteristic impedance through the attenuator 42. A resistor 76 applies the jamming signal to PIN diode 78, causing it to conduct and therefore changing said characteristic impedance. This causes a very bad impedance mismatch, thereby reflecting almost all of the incident power. This in turn causes a large amount of attenuation. When no attenuation is needed, the diode 78 is non-conducting. When the diode is conducting it inherently has a certain amount of inductance. This causes a leakage signal to appear at output 50. By providing mutual inductance between coils 66 and 68 of a selected polarity, a signal will appear at terminals 50 cancelling the first signal. Therefore, a high degree of attenuation is achieved in a simple circuit at low cost.

It will be appreciated that many other embodiments are possible without departing from the spirit and scope of the invention.

What is claimed is:

1. A circuit for jamming a radio frequency signal, said circuit comprising:
   a switched buffer having signal input means for receiving said radio frequency signal, control input means for receiving a control signal, and an output;
   an AND gate having a pair of input means for receiving said control signal and a jamming signal respectively, and an output; and
   a switched attenuator having a signal input coupled to said buffer output, a control input coupled to said gate output, and an output means for providing in accordance with said control signal a jammed or unjammed signal.

2. A circuit as claimed in claim 1, wherein said jamming signal comprises a pulse signal having a 60 Hz repetition rate and a 15 percent duty factor.

3. A circuit as claimed in claim 1, wherein said switched buffer comprises a series circuit coupled between said buffer input means and output and including a resistor and a capacitor series coupled to said resistor, and a switching diode coupled across said series circuit and to said buffer control input means.

4. A circuit as claimed in claim 1, wherein said attenuator comprises a pair of series coupled coils coupled between said attenuator input and output means, three capacitors each having one end coupled to ground and the other end coupled to the ends of said coils and the junction between said coils respectively, and a switching diode coupled between said junction and ground.

5. A circuit as claimed in claim 4, wherein said switching diode comprises inherent conducting inductance, whereby an output signal appears at said attenuator output means when attenuation is required, said coils having mutual inductance therebetween of selected amount and polarity, whereby said output signal is substantially cancelled.

6. A circuit as claimed in claim 4, wherein the junction coupled capacitor and said coils provide a selected characteristic impedance.

7. A plurality of circuits as claimed in claim 1, further comprising a splitter network having an input means for receiving said radio frequency signal and a plurality of outputs coupled to said buffer input means respectively.

* * * * *